(12) United States Patent
Guilbert et al.

(10) Patent No.: US 12,363,401 B2
(45) Date of Patent: Jul. 15, 2025

(54) AUTOMATIC ALIGNMENT OF VIDEO STREAMS

(71) Applicant: Genius Sports SS, LLC, Los Angeles, CA (US)

(72) Inventors: Pierre Claude Thierry Guilbert, Saint Sulpice (CH); Ryan Martin Uhlenbrock, Camarillo, CA (US); Cynthia Oeschger, Fribourg (CH); Charles Xavier Quentin Dubout, Ecublens (CH); Horesh Beny Ben Shitrit, Echichens (CH)

(73) Assignee: Genius Sports SS, LLC, Los Angeles, CA (US)

( * ) Notice: Subject to any disclaimer, the term of this patent is extended or adjusted under 35 U.S.C. 154(b) by 0 days.

(21) Appl. No.: 18/346,355

(22) Filed: Jul. 3, 2023

(65) Prior Publication Data

US 2024/0007723 A1 Jan. 4, 2024

Related U.S. Application Data

(60) Provisional application No. 63/357,979, filed on Jul. 1, 2022.

(51) Int. Cl.
*H04N 21/8547* (2011.01)
*G06V 20/40* (2022.01)
*G06V 40/20* (2022.01)

(52) U.S. Cl.
CPC ......... *H04N 21/8547* (2013.01); *G06V 20/42* (2022.01); *G06V 20/44* (2022.01); *G06V 40/20* (2022.01)

(58) Field of Classification Search
CPC ......... H04N 21/8547; H04N 21/21805; H04N 21/2187; H04N 21/23418; H04N 21/242; H04N 21/43072; G06V 20/42; G06V 20/44; G06V 40/20; G06V 40/103; G06V 40/23; G06V 2201/02
See application file for complete search history.

(56) References Cited

U.S. PATENT DOCUMENTS

| | | | |
|---|---|---|---|
| 10,600,210 | B1 | 3/2020 | Citraro et al. |
| 10,755,102 | B2 | 8/2020 | Chang et al. |
| 2007/0201815 | A1* | 8/2007 | Griffin ................. G11B 27/10 386/234 |
| 2013/0282804 | A1 | 10/2013 | Mate et al. |
| 2013/0305156 | A1 | 11/2013 | Hohteri et al. |
| 2015/0221096 | A1 | 8/2015 | Gefen et al. |
| 2017/0182621 | A1 | 7/2017 | Leem et al. |
| 2017/0192621 | A1 | 7/2017 | Leem et al. |
| 2018/0184138 | A1 | 6/2018 | Shaw et al. |

(Continued)

OTHER PUBLICATIONS

United Kingdom Examination report dated Aug. 8, 2024 for United Kingdom Application No. GB2310184.3.

*Primary Examiner* — Chenea Davis
(74) *Attorney, Agent, or Firm* — EIP US LLP

(57) ABSTRACT

Methods and systems for determining a time offset between a first video stream and a second video stream that depict a sporting event. Depictions of a first kind of visually distinctive activity are identified in the first and second video streams. The time offset between the two video streams is determined at least in part by comparing the depictions of the first kind of visually distinctive activity in the first video stream with those in the second video stream.

9 Claims, 14 Drawing Sheets

(56) References Cited

U.S. PATENT DOCUMENTS

| | | |
|---|---|---|
| 2019/0110096 A1* | 4/2019 | Shaw ............... H04N 21/43072 |
| 2019/0354765 A1 | 11/2019 | Chan et al. |
| 2020/0311433 A1 | 10/2020 | Oz et al. |
| 2021/0077886 A1 | 3/2021 | Seitz et al. |
| 2021/0397846 A1 | 12/2021 | Chang et al. |

* cited by examiner

AUTOMATIC ALIGNMENT OF VIDEO STREAMS

CROSS-REFERENCE TO RELATED APPLICATIONS

The present application claims the benefit of U.S. Patent Application Ser. No. 63/357,979, filed Jul. 1, 2022, and entitled "AUTOMATIC ALIGNMENT OF VIDEO STREAMS".

The content of the foregoing application is hereby incorporated by reference in its entirety for all purposes.

BACKGROUND OF THE INVENTION

Field of the Invention

The present invention relates to methods and systems for processing video, in particular for time-aligning video streams, i.e., for determining a time offset between video streams. In embodiments disclosed herein, the video streams depict live events, such as, in particular, sporting events.

Description of the Related Technology

Live events, such as sports events, especially at the college and professional levels, continue to grow in popularity and revenue as individual colleges and franchises reap billions in revenue each year. Understanding the time offset between video streams depicting a live event may be important (or even essential) for carrying out various kinds of processing of such video streams, such as processing the video streams to generate analytics of the event (e.g., in the case of a sports event, analytics regarding the game, the teams and/or the players) or processing the video streams to generate augmented video content of the event, e.g., a single video showing a highlight of a play from multiple angles.

SUMMARY

In accordance with a first aspect of the present disclosure there is provided a video processing method comprising: identifying one or more depictions of a first kind of visually distinctive activity in a first video stream depicting a sporting event; identifying one or more depictions of the first kind of visually distinctive activity in a second video stream depicting the sporting event; and determining a time offset between the first video stream and the second video stream, wherein said determining of the time offset comprises comparing the one or more depictions of the first kind of visually distinctive activity in the first video stream with the one or more depictions of the first kind of visually distinctive activity in the second video stream.

In embodiments, the method comprises processing at least one of the first and second video streams based on the time offset. In examples, the processing comprises carrying out spatiotemporal pattern recognition based on the first video stream, the second video stream, and the time offset therebetween. Additionally, or alternatively, the processing comprises generating video content (e.g. augmented video content) based on the first video stream, the second video stream, and the time offset therebetween.

In embodiments, the method comprises receiving the first video stream from a first portable device comprising a camera. The first portable device can, for example, be a smartphone. Optionally, the method comprises receiving the second video stream from a second portable device comprising a camera. The second portable device can, for example, be a smartphone.

In accordance with a second aspect of the present disclosure there is provided a video processing system comprising: memory storing a plurality of computer-executable instructions; one or more processors that execute the computer-executable instructions, the computer-executable instructions causing the one or more processors to: identify one or more depictions of a first kind of visually distinctive activity in a first video stream depicting a sporting event; identify one or more depictions of the first kind of visually distinctive activity in a second video stream depicting the sporting event; and determine a time offset between the first video stream and the second video stream, wherein the system determines the time offset at least by comparing the one or more depictions of the first kind of visually distinctive activity in the first video stream with the one or more depictions of the first kind of visually distinctive activity in the second video stream.

In embodiments, the system is configured to receive the first video stream from a first portable device comprising a camera. The first portable device can, for example, be a smartphone. Optionally, the system is configured to receive the second video stream from a second portable device comprising a camera. The second portable device can, for example, be a smartphone.

In accordance with a third aspect of the present disclosure there is provided a non-transitory, computer-readable storage medium comprising a set of computer-readable instructions which, when executed by one or more processors, cause the one or more processors to: identify one or more depictions of a first kind of visually distinctive activity in a first video stream depicting a sporting event; identify one or more depictions of the first kind of visually distinctive activity in a second video stream depicting the sporting event; and determine a time offset between the first video stream and the second video stream, wherein the system determines the time offset at least by comparing the one or more depictions of the first kind of visually distinctive activity in the first video stream with the one or more depictions of the first kind of visually distinctive activity in the second video stream.

In embodiments of the second and third aspects of the disclosure, the computer-executable instructions additionally cause the one or more processors to: process at least one of the first and second video streams based on the time offset. In examples, the processing comprises carrying out spatiotemporal pattern recognition based on the first video stream, the second video stream, and the time offset therebetween. Additionally, or alternatively, the processing comprises generating video content (e.g. augmented video content) based on the first video stream, the second video stream, and the time offset therebetween.

In embodiments of the second and third aspects of the disclosure, the computer-executable instructions cause the one or more processors to: identify one or more depictions of a second kind of visually distinctive activity in the first video stream; and identify one or more depictions of the second kind of visually distinctive activity in the second video stream, wherein the system determines the time offset at least by comparing the one or more depictions of the second kind of visually distinctive activity in the first video stream with the one or more depictions of visually distinctive activity in the second video stream.

While in the aspects and embodiments above the video streams depict a sporting event, in methods and systems according to further aspects the event may be a non-sporting live event, such as a concert, a comedy show, or a play.

Further features and advantages will become apparent from the following description, given by way of example only, which is made with reference to the accompanying drawings.

DETAILED DESCRIPTION OF CERTAIN INVENTIVE EMBODIMENTS

Embodiments of this application relate to automatic alignment of video streams, in particular video streams that depict live events, such as sporting events.

Figure 1:
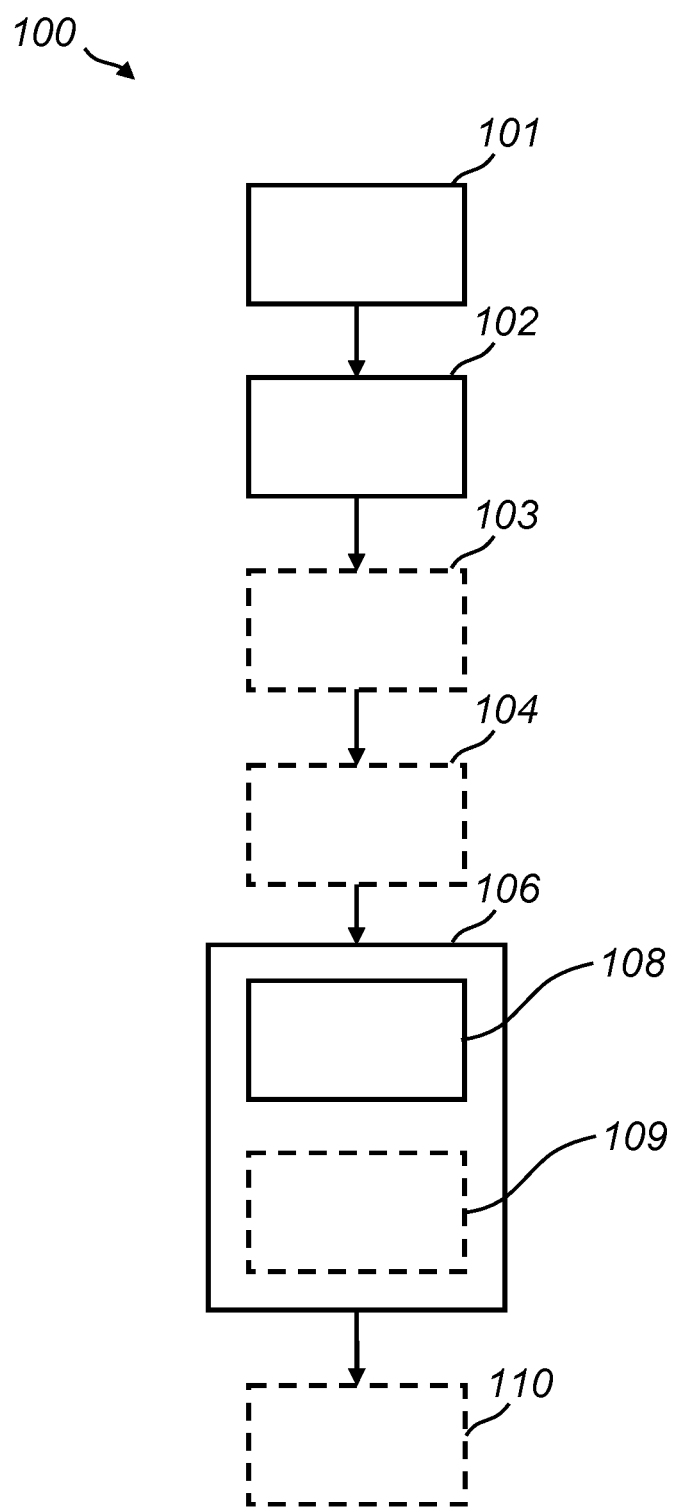
FIG. 1 is a flow chart illustrating a video processing method according to an illustrative embodiment.

Reference is directed firstly to FIG. 1, which is a flow chart illustrating a video processing method 100 according to an illustrative embodiment. As shown, the method 100 comprises a step 101 of identifying one or more depictions of a first kind of visually distinctive activity in a first video stream. In many of the examples illustrated herein, the first video stream depicts a sporting event, such as a soccer match, basketball match, tennis match, etc.; however, it is envisaged that the approaches described herein may equally be applied to video streams that depict non-sporting events.

As also shown in FIG. 1, method 100 further comprises a step 102 of identifying one or more depictions of the same kind of visually distinctive activity in a second video stream that depicts the same sporting event.

As will be explained below with reference to the examples illustrated in FIGS. 2-10B, the method 100 of FIG. 1 may make use of various kinds of visually distinctive activity to determine a time offset between two video streams. The kinds of visually distinctive activity described below with reference to FIGS. 2A-10B may, for example, be characterized as: being visible from multiple positions and orientations at the sporting event; having visible changes that can be temporally localized, for example because they change in appearance abruptly from one frame to the next frame in a video stream (e.g. because of changes in location, motion and/or or patterning); and/or changing in appearance regularly over the course of the sporting event. Hence (or otherwise), depictions of such visually distinctive activity can be readily and/or robustly identified within two (or more) video streams of the same sporting event.

The video streams of the sporting event can be received from various sources. In particular, it is envisaged that the method 100 of FIG. 1 could be employed where the first and/or the second video streams are generated by portable devices that comprise cameras, such as smartphones or tablet devices. It is believed that solutions are lacking for alignment of video streams generated by such devices, as compared with video streams generated by conventional, broadcast cameras. Nevertheless, the method 100 of FIG. 1 can be employed where the first and/or the second video streams are generated by conventional, broadcast cameras instead.

Returning to FIG. 1, it can be seen that method 100 further comprises a step 106 of determining a time offset between the first video stream and the second video stream. As indicated at block 108, this step 106 comprises comparing the depictions of the first kind of visually distinctive activity in the first video stream with the one or more depictions of the first kind of visually distinctive activity in the second video stream.

In some examples, such as those described with reference to FIGS. 3A-6, this comparison might comprise comparing the intensity (e.g. the mean or median intensity) of some or all of the pixels that correspond to the depictions of the first kind of visually distinctive activity in the first video stream with the intensity (e.g. the mean or median intensity) of some or all of the pixels that correspond to the depictions of the first kind of visually distinctive activity in the second video stream. Alternatively (or additionally), movements and/or locations of the depictions of the first kind of visually distinctive activity in the first video stream could be compared with movements and/or locations of the depictions of the first kind of visually distinctive activity in the second video stream, as is the case in the examples described with reference to FIGS. 7A-10B.

As further shown in FIG. 1, the method 100 can optionally comprise an additional video processing step 110 that follows the step 106 of determining a time offset between the first video stream and the second video stream. In this additional video processing step 110, the thus-determined time offset is utilized in the processing of one or both of the first and second video streams. The additional processing step 110 could, for example, comprise carrying out spatiotemporal pattern recognition based on the first video stream, the second video stream, and the time offset therebetween. Additionally, or alternatively, step 110 could comprise generating video content (e.g. augmented video content) based on the first video stream, the second video stream, and the time offset therebetween. For example, video content could be generated that simultaneously shows two views of the same highlight from the sporting event (the two views corresponding to the first and second video streams), with the video of the two views of the highlight being synchronized.

Attention is now directed to FIGS. 2A-10B, which illustrate various kinds of visually distinctive activity that can be identified in steps 101 and 102 of the video processing method 100 of FIG. 1 so as to determine a time offset between two video streams.

Alignment Using Game Clock

Figure 2A:
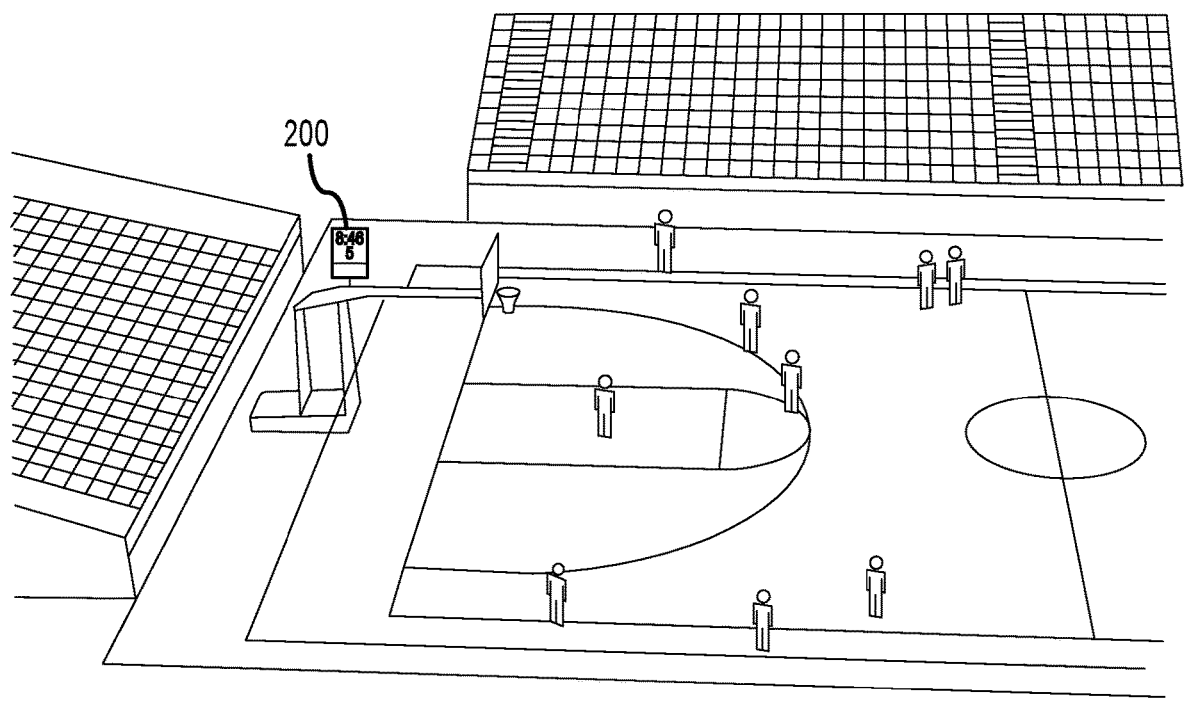
FIGS. 2A and 2B show video frames from two different video streams of a sporting event, and illustrate how changes in the game clock for the sporting event can be used to align the two video streams.
Figure 2B:
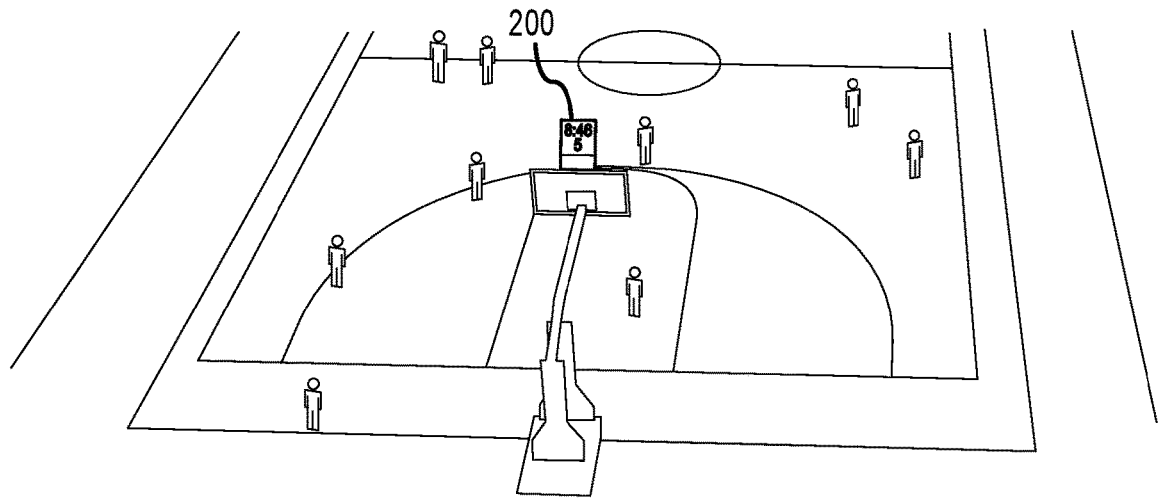

Referring to FIGS. 2A and 2B, a first illustrative example of a suitable type of visually distinctive activity is the changing of the time shown on a clock at the sporting event. In particular examples, the clock may be a game clock, i.e., a clock showing the time elapsed or remaining in a game, or a playing period thereof.

FIGS. 2A and 2B show video frames from two different video streams of a sporting event, which, in the particular example shown, is a basketball game. As may be seen, the game clock 200 is visible in both video streams, even though the video streams correspond to significantly different viewpoints of the game. A game clock is, by design, intended to be visible from multiple positions and orientations at the sporting event—the function of a game clock is to allow spectators to be aware of the current time in the game. Additionally, a game clock can be characterized as changing abruptly in appearance from one frame to the next of a video stream, so that a change in the time on the game clock is indicative of a very narrow time window. Furthermore, a game clock, by its nature, changes in appearance regularly over the course of the sporting event. For these reasons (and/or other reasons), using changes in the time shown on a clock at the sporting event as the first kind of visually distinctive activity in the method 100 of FIG. 1 may provide robust and/or accurate alignment of video streams.

In steps 101 and 102 of the method 100 of FIG. 1, depictions of the changing time on a clock can, for example, be identified by using an optical character recognition algorithm on frames of each video stream. In specific examples, the optical character recognition algorithm can be applied to a specific portion of each frame that is expected to contain the clock. The clock-containing portion of the frame can, for example, be determined using knowledge of the real-world shape, position and orientation of the clock in the venue, and knowledge of the position and orientation of the cameras providing the video streams (e.g., by calibrating the camera). Alternatively (or in addition), the clock-containing portion of the frame could be determined using a segmentation algorithm that utilizes a suitably trained neural network, such as Mask R-CNN.

In step 106, comparing the depictions of the changing time on the clock in the first video stream with the depictions of the changing time on the clock in the second video stream could, for example, comprise comparing the frame number, for each video stream (or the time within each video stream), at which one or more game clock time transitions (e.g., from 12:00 to 12:01, or from 1:41 to 1:42) occur. In general, performing such a comparison for multiple game clock transitions may yield a more accurate estimate of the time offset between the video streams.

Alignment Using Camera Flashes

A further example of a suitable kind of visually distinctive activity is the occurrence of camera flashes during a sporting event. Camera flashes can be characterized as being visible from multiple positions and orientations at the sporting event, given the very high intensity of the light emitted by a camera flash unit. Additionally, camera flashes change in appearance abruptly from one frame to the next frame in a video stream, given the short duration of a camera flash (typically, less than the time between two frames of a video stream) and the rapid increase in brightness that a camera flash unit produces. Furthermore, camera flashes can be characterized as changing in appearance regularly over the course of the sporting event. For these reasons (and/or other reasons), using camera flashes as the first kind of visually distinctive activity in the method 100 of FIG. 1 may provide robust and/or accurate alignment of video streams.

Reference is now directed to FIGS. 3A-3D, which show two video frames from each of two video streams of a sporting event. As is apparent, in the particular example shown, the sporting event is a basketball game. It may be noted that camera flashes are particularly visible at indoor sporting events, such as basketball or ice hockey games. Hence, camera flashes may be a particularly suitable choice of a visually distinctive activity to be identified when time aligning video streams of indoor sports events using the method 100 of FIG. 1.

Figure 3A:
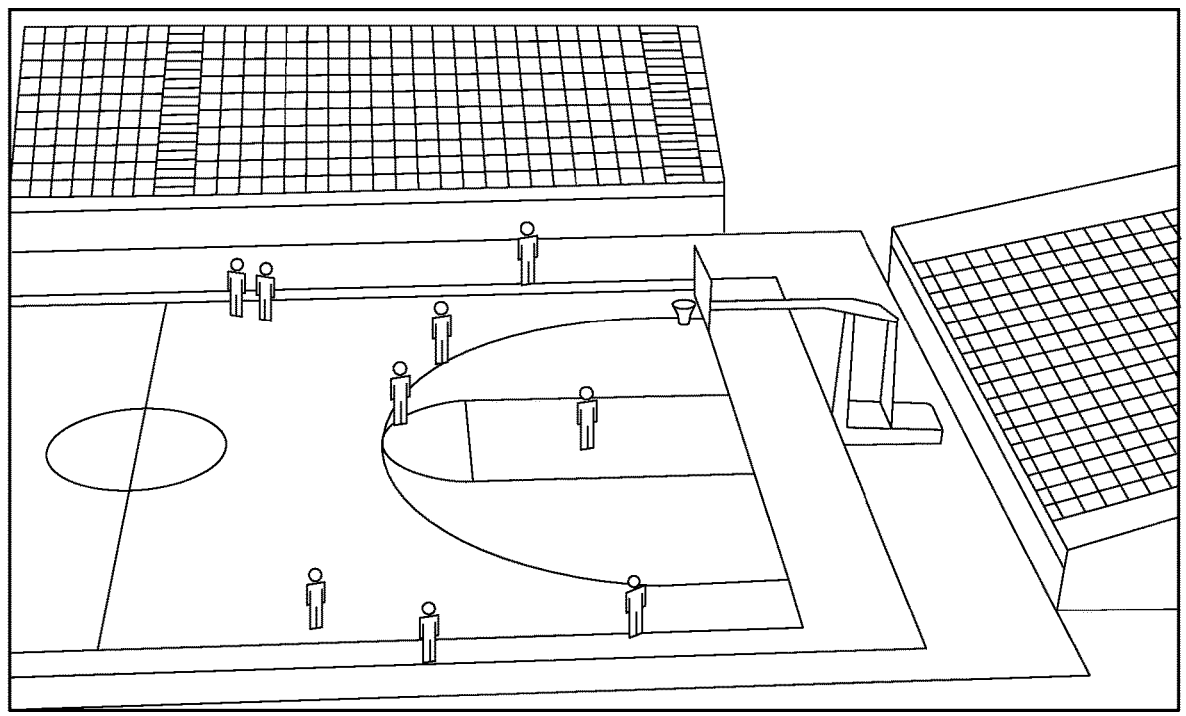
FIGS. 3A-3D show two video frames from each of two video streams of a sporting event, and illustrate how camera flashes that occur during the sporting event can be used to align the two video streams.
Figure 3B:
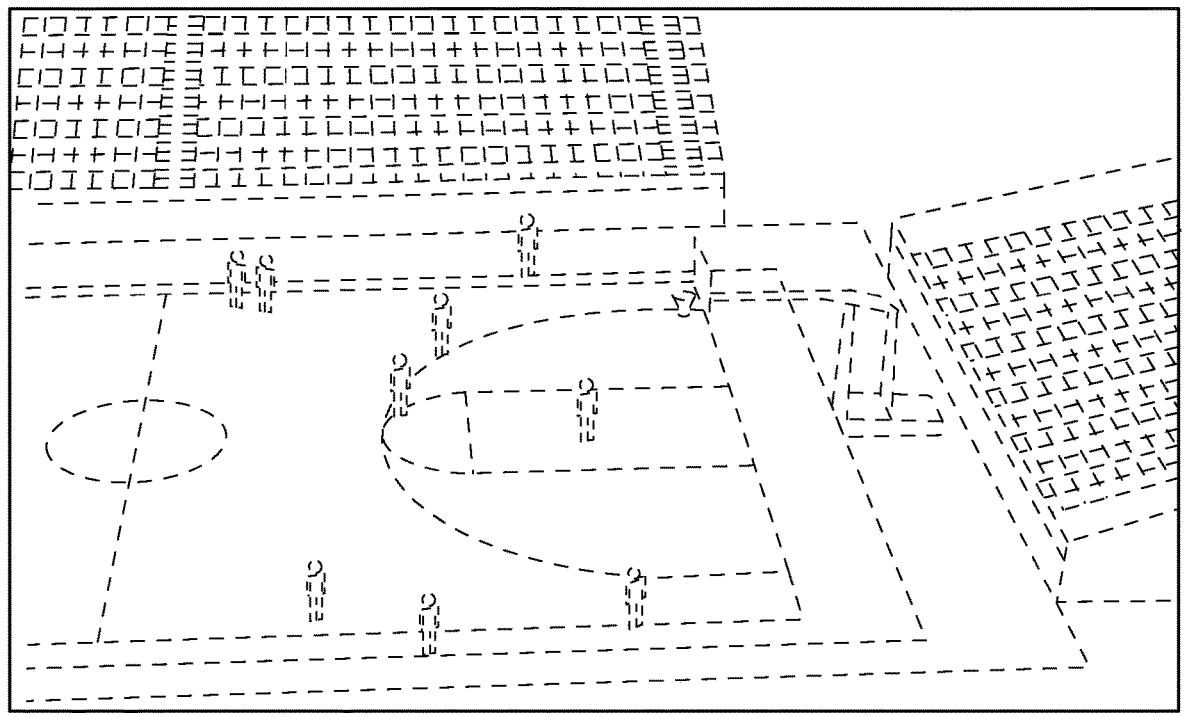
Figure 3C:
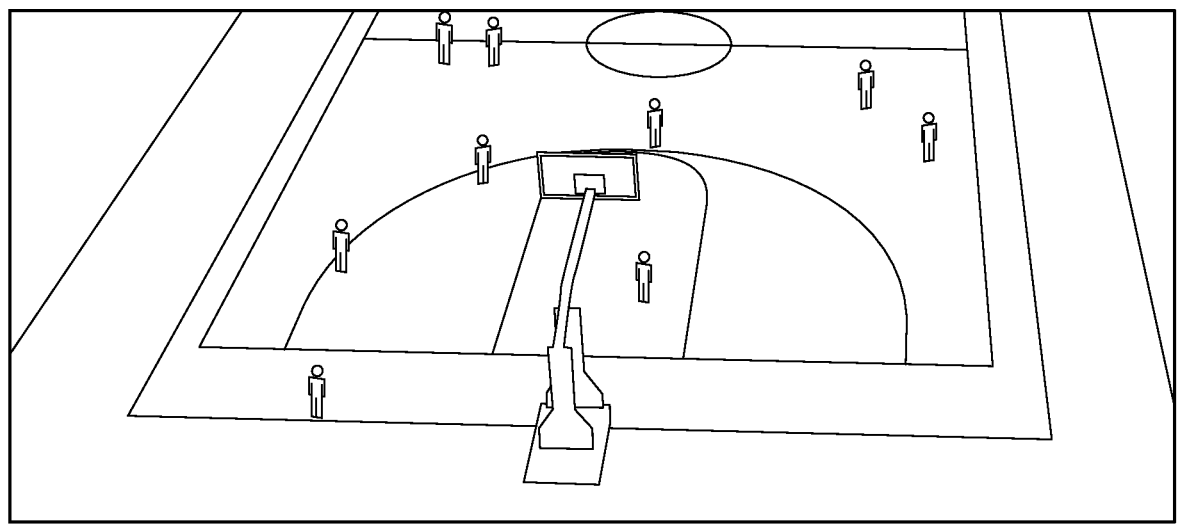
Figure 3D:
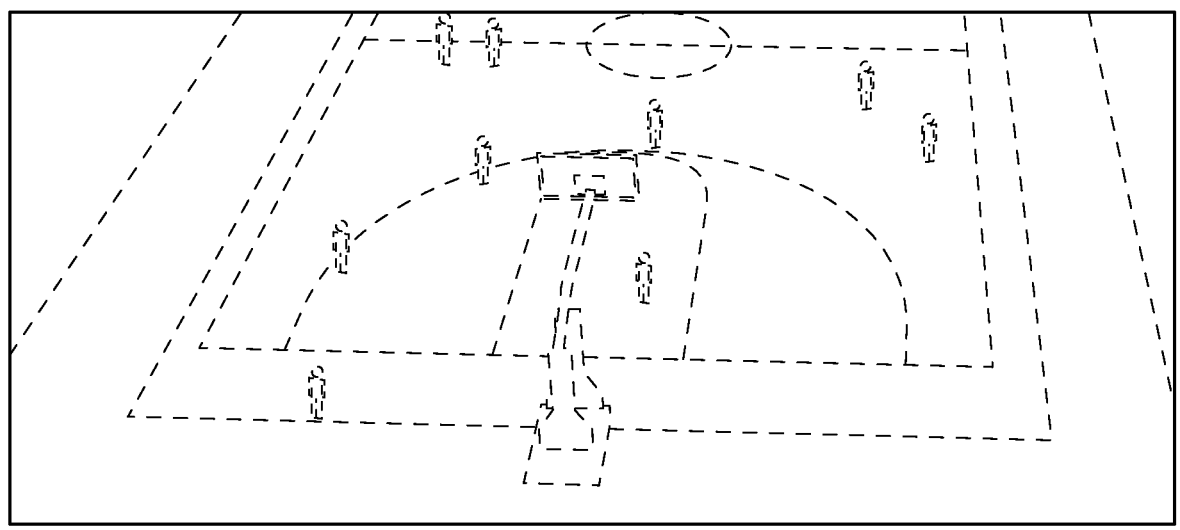

FIGS. 3A and 3B show, respectively, a first frame, where no camera flashes are occurring, and a second frame, where one or more camera flashes are occurring; both the frames are from the same video stream and are therefore taken from the same viewpoint. FIGS. 3C and 3D similarly show first and second frames from a second video stream, where no camera flashes are occurring in the first frame (FIG. 3C), but one or more camera flashes are occurring in the second frame (FIG. 3D). As is apparent, the second video stream (illustrated in FIGS. 3C and 3D) is taken from a different viewpoint to the first video stream (illustrated in FIGS. 3A and 3B).

Figure 4A:
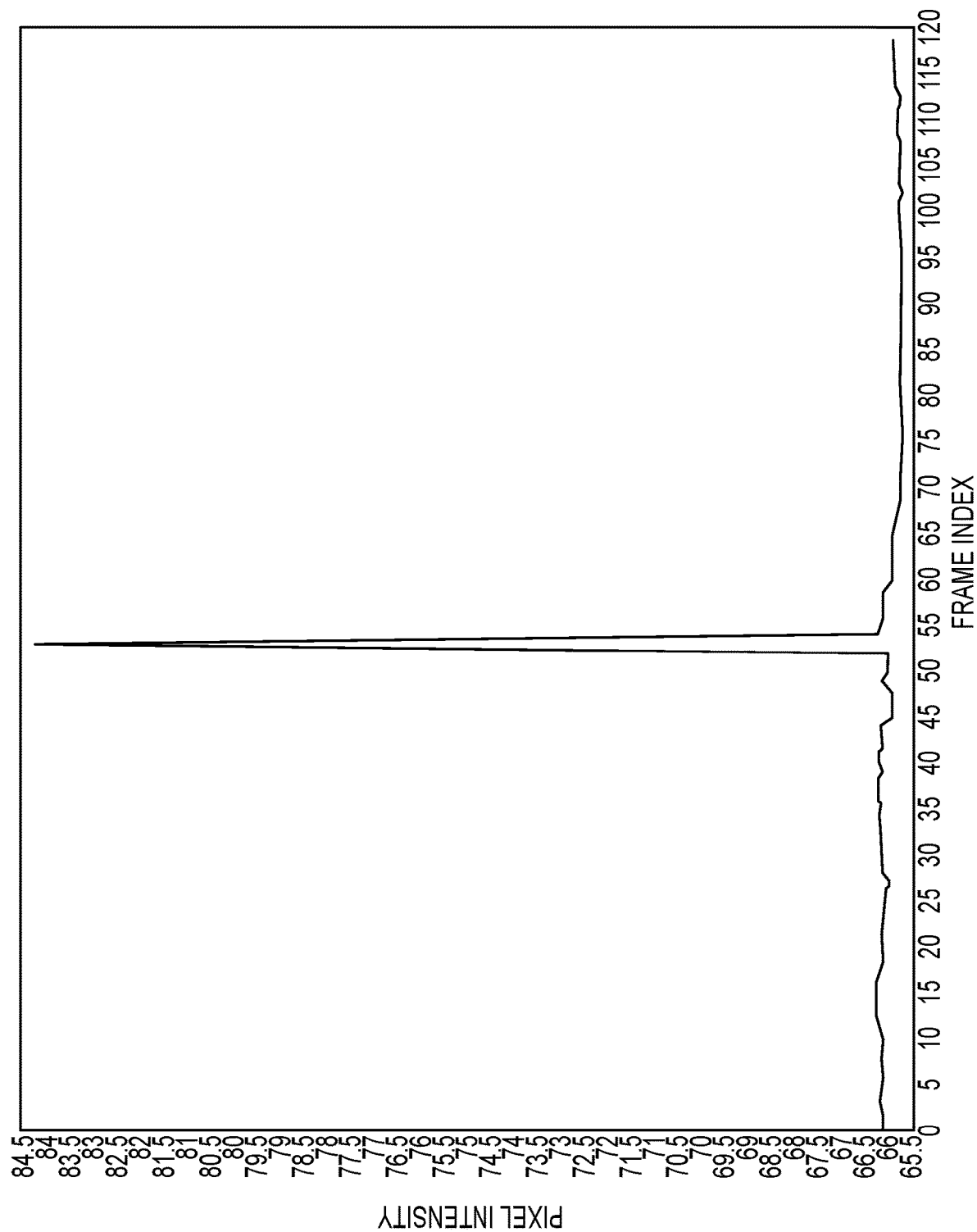
FIGS. 4A and 4B are graphs of the pixel intensity with respect to time for, respectively, the video stream whose frames are shown in FIGS. 3A and 3B, and the video steam whose frames are shown in FIGS. 3C and 3D.
Figure 4B:
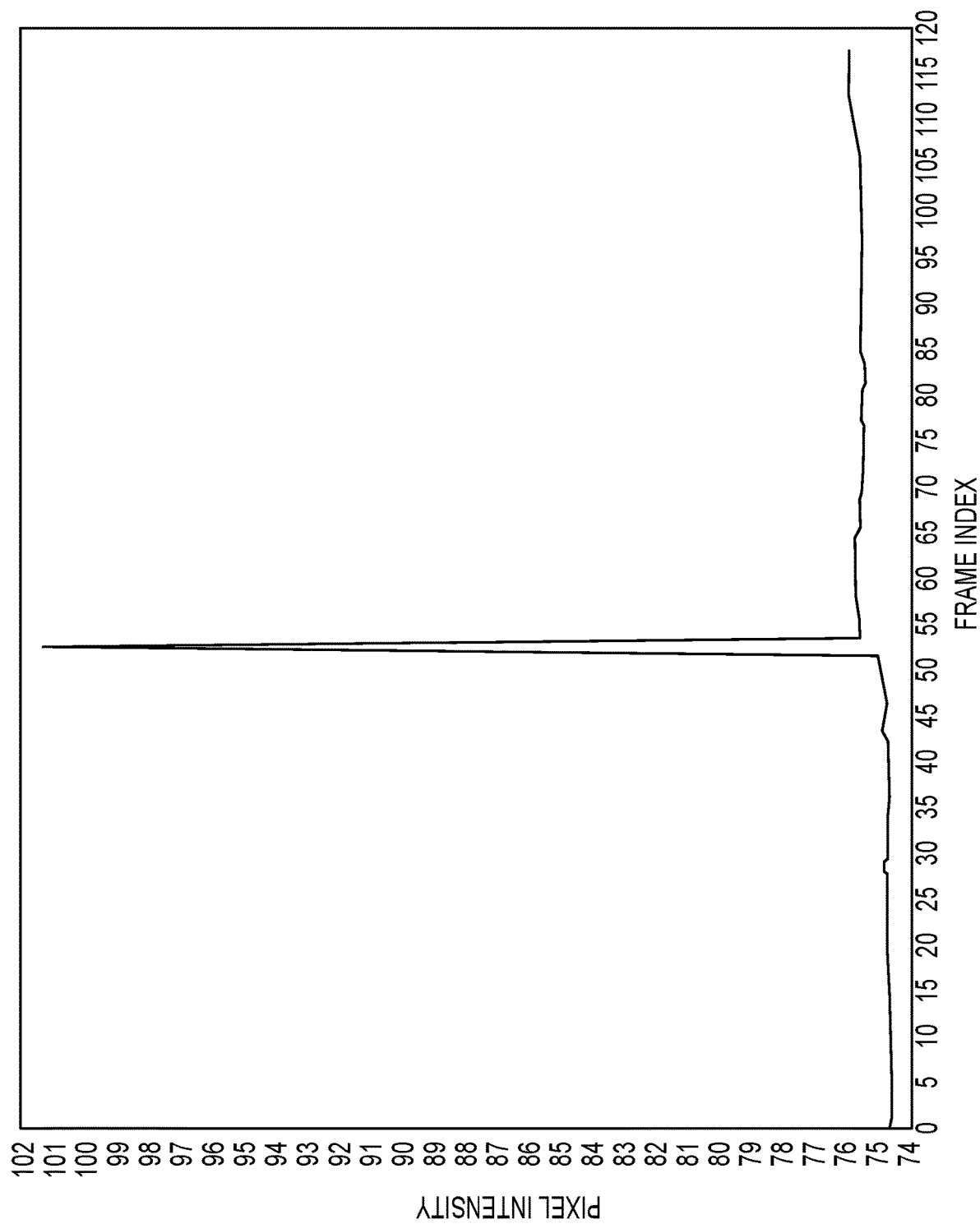

In steps 101 and 102 of the method 100 of FIG. 1, depictions of camera flashes can, for example, be identified in a given video stream by analyzing the pixel intensity (e.g., the total or mean pixel intensity) for some or all of the frames in the video stream. The inventors have determined that frames that depict camera flashes will be significantly overexposed. Hence, frames with particularly high pixel intensity likely depict camera flashes. This is illustrated in FIGS. 4A and 4B, which are graphs of the pixel intensity with respect to time for, respectively, the video stream whose frames are shown in FIGS. 3A and 3B, and the video steam whose frames are shown in FIGS. 3C and 3D. As is apparent, each graph includes a peak of extremely short duration, with a pixel intensity that is substantially higher than the immediately preceding or succeeding frames. This peak in pixel intensity corresponds to the camera flash depicted in FIGS. 3B and 3D.

In step 106, comparing the depictions of the camera flashes in the first video stream with the depictions of the camera flashes in the second video stream could, for example, comprise comparing the frame number, for each video stream, at which particularly short duration and large magnitude peaks in pixel intensity occur. A simple approach, which may be utilized in some examples, is to assume flashes are very short, as compared with the frame rate, so that each flash lands on only one frame (or zero frames, if the flash occurs during the "dead time" of the camera sensor, e.g., when the shutter is closed), and that each flash increases the mean image intensity very significantly for that frame only.

Other examples can utilize a more complex approach where flashes have some unknown short duration, and so have the potential to straddle two or more consecutive frames. Such an approach can also take into account if the camera has a global or rolling shutter and can use camera specs/info to determine when the sensor is open or closed. From that, and from the average frame intensity (in the case of a global shutter) or per-line intensity (in the case of a rolling shutter) the model can estimate the most likely flash start/end times.

Whether a simple approach or a more complex approach is adopted for determining the timing of each flash, performing a comparison for multiple camera flashes may yield a more accurate estimate of the time offset between the video streams.

Alignment Using Electronic Displays

A further example of a kind of visually distinctive activity that is suitable for aligning video streams is the change in images and/or patterns shown on one or more electronic displays at a sporting event. In specific examples, the electronic displays are advertising boards, but could also be "big screens" that show highlights or other video content to spectators at the sporting event.

Electronic displays at sporting events are, by design, visible from multiple positions and orientations at the sporting event—they are intended to be viewable by most, if not all spectators. Additionally, electronic displays can be characterized as changing abruptly in appearance from one frame to the next of a video stream. Furthermore, electronic displays, by their nature, change in appearance regularly over the course of the sporting event. For these reasons (and/or other reasons), using changes in the images and/or patterns shown on one or more electronic displays at the sporting event as the first kind of visually distinctive activity in the method 100 of FIG. 1 may provide robust and/or accurate alignment of video streams.

In steps 101 and 102 of the method 100 of FIG. 1, depictions of electronic displays within a video stream may be identified using knowledge of the real-world shape, position and orientation of the electronic displays, and knowledge of the real-world position and orientation of the cameras providing the video streams. Electronic displays at sporting events are rarely moved, given their large size, and typically have simple, regular shapes (e.g. they are rectangular). Hence (or otherwise), knowledge of the shape, position and orientation of the electronic displays can be obtained and maintained relatively straightforwardly. Knowledge of the position and orientation of the cameras providing the video streams can be acquired by calibration of the intrinsic and extrinsic parameters of each camera. A wide range of approaches for camera calibration is available, including those disclosed in commonly assigned U.S. Pat. No. 10,600,210 B1 (the disclosure of which is hereby incorporated by reference).

In other examples, depictions of electronic displays within a video stream could be identified using alternative approaches, for example using a segmentation algorithm that utilizes a suitably trained neural network, such as Mask R-CNN.

In step 106 of method 100, comparing the depictions of the electronic displays in the first video stream with the depictions of the electronic displays in the second video stream could, for example, comprise comparing the change, over time, in the pixel intensity for some or all of the pixels that have been identified in step 101 as depicting electronic display(s) in the first video stream, with the change, over time, in the pixel intensity for some/all of the pixels that have been identified in step 102 as depicting electronic display(s) in the second video stream.

Figure 5A:
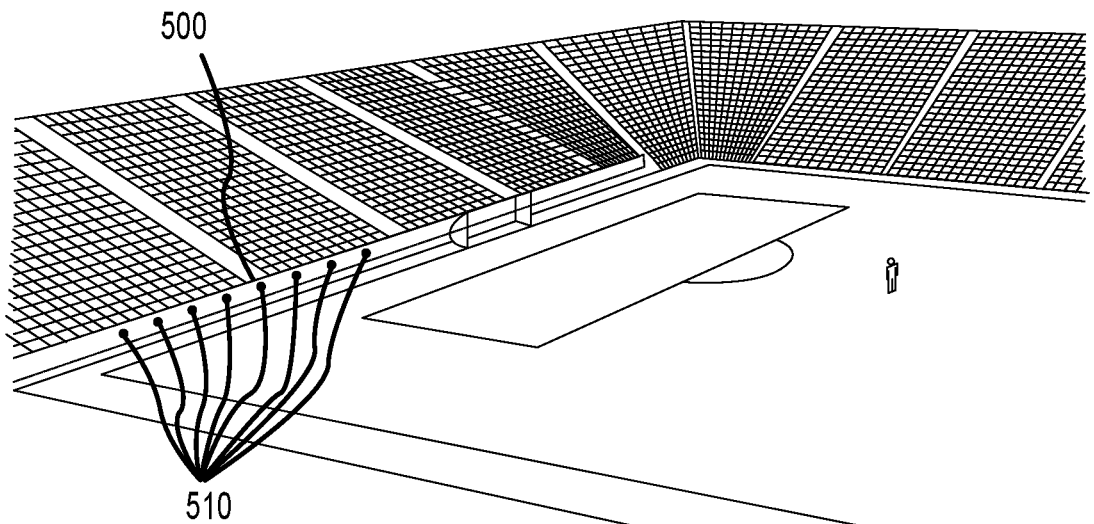
FIGS. 5A-5D show two video frames from each of two video streams of a sporting event, and illustrate how advertising boards at the sporting event can be used to align the two video streams.
Figure 5B:
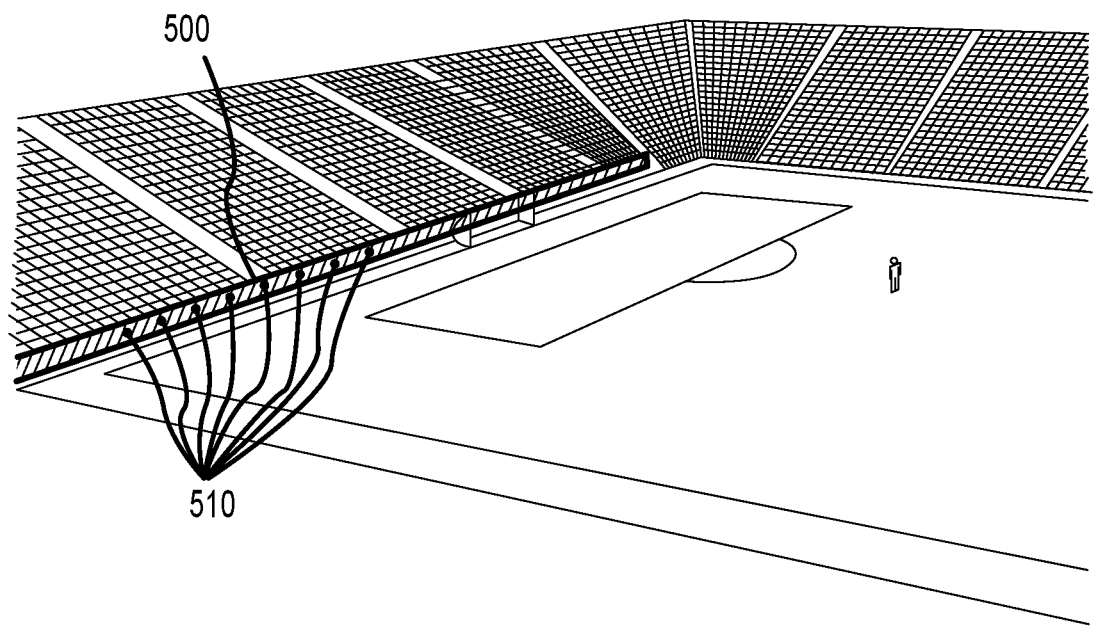
Figure 5C:
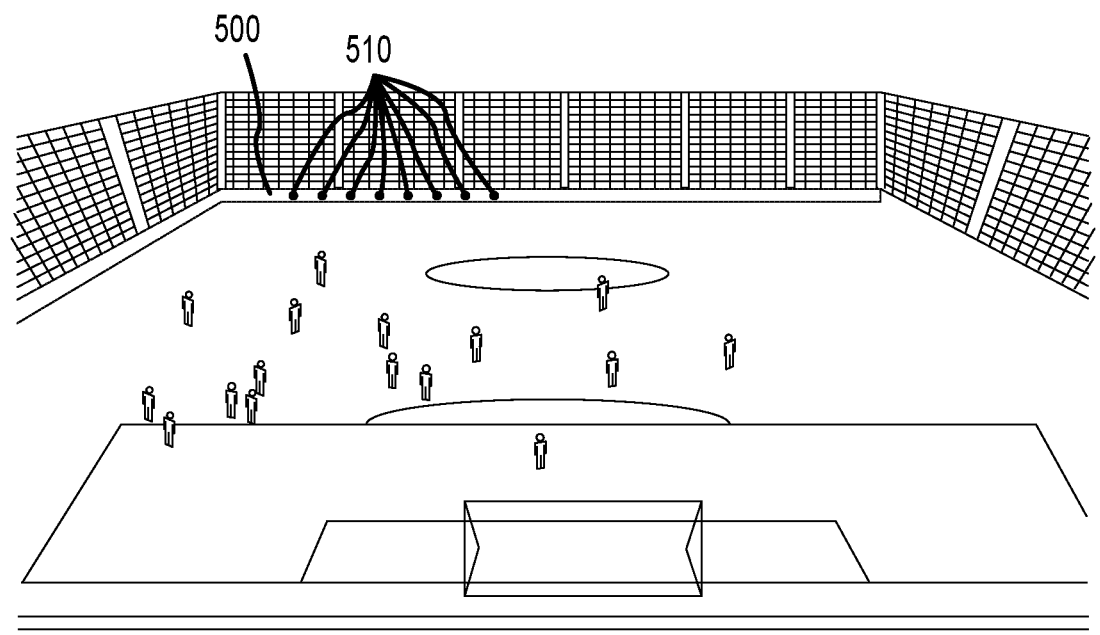
Figure 5D:
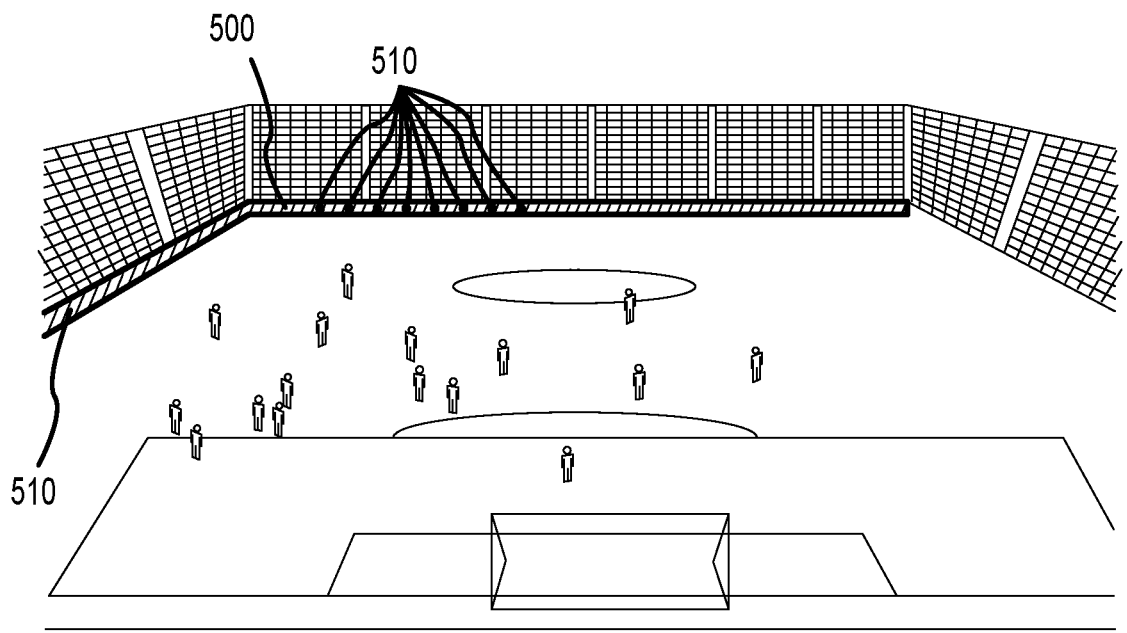
Figure 6:
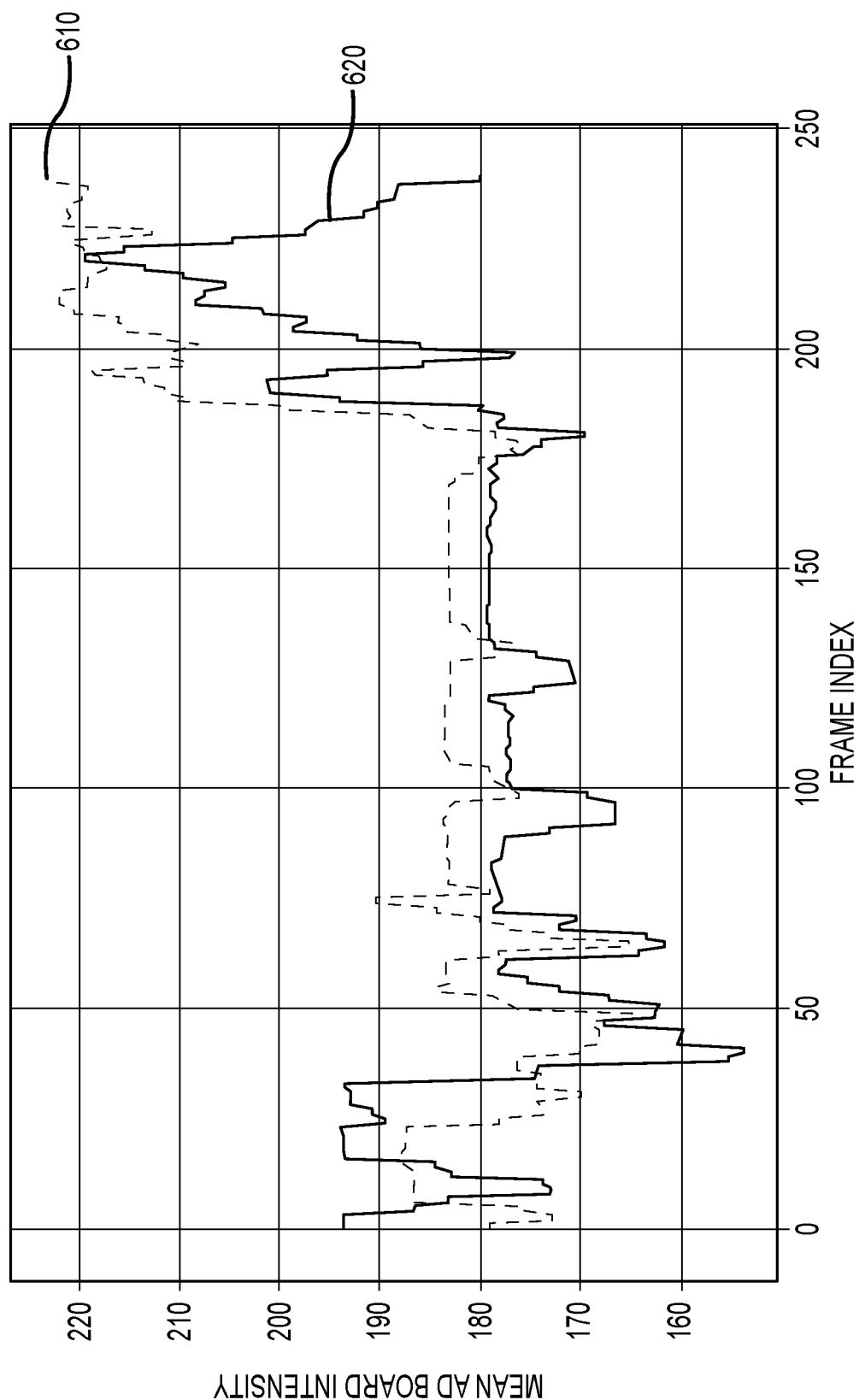
FIG. 6 is a line graph that displays the pixel intensity with respect to time for the video stream whose frames are shown in FIGS. 5A and 5B, and the pixel intensity with respect to time for the video steam whose frames are shown in FIGS. 5C and 5D.

An example of such an approach is illustrated in FIGS. 5A-5D and FIG. 6. FIGS. 5A-5D show two video frames from each of two video streams of a sporting event. In the particular example shown, the sporting event is a soccer match. At the edge of the field are several advertising boards 150. As is apparent, the advertising boards 150 are visible within both the first video stream (shown in FIGS. 5A and 5B) and in the second video stream (shown in FIGS. 5C and 5D), even though the video streams correspond to significantly different viewpoints of the game. FIG. 6 is a line graph of pixel intensity with respect to time for a subset 510 of the pixels that depict the advertising boards.

In the example illustrated in FIGS. 5A and 5B, the subset of pixels 510 for the first video stream (shown in FIGS. 5A and 5B) correspond to the same real-world locations as the subset of pixels 510 for the second video stream (shown in FIGS. 5C and 5D). This can be accomplished using knowledge of the real-world shape, position and orientation of the advertising boards 150, as discussed above, and/or using image feature matching. Such an approach may provide more robust and/or accurate determination of the time offset, as the same part of the display will be sampled from each video stream. However, it is not essential that the two subsets of pixels 510 correspond to the same real-world locations, for example because large scale transitions (e.g., the display going black, or changing from one advertisement to the next) will still be identifiable within the pixel intensity time series for the two video streams, even where the subsets of sampled pixels 510 correspond to different part of the display. Such a large scale transition is illustrated in FIGS. 5A-5D by the hatching of the display boards 150 in FIGS. 5B and 5D, which is not visible in FIGS. 5A and 5C.

Returning to FIG. 6, it can be seen that a first line 610 shows pixel intensity for the video stream whose frames are shown in FIGS. 5A and 5B, and a second line 620 shows the pixel intensity with respect to time for the video steam whose frames are shown in FIGS. 5C and 5D. The two time series can be compared, for example using a cross-correlation function, in order to find a likely time offset between the two series.

Alignment Using Ball Movements

A further example of a kind of visually distinctive activity that is suitable for aligning video streams is movement in the ball, puck, or similar contested object that is in play at a sporting event.

As with the other kinds of visually distinctive activity discussed above, the ball (or other contested object) can be characterized as being: visible from multiple positions and orientations at the sporting event; changing abruptly in appearance from one frame to the next of a video stream (particularly when kicked, thrown, caught etc. by a player); and changing in appearance regularly over the course of the sporting event. For these reasons (and/or other reasons), using movement of the ball (or other contested object) as the first kind of visually distinctive activity in the method 100 of FIG. 1 may provide robust and/or accurate alignment of video streams.

In steps 101 and 102 of method 100, depictions of the ball within a video stream may be identified using various approaches. For instance, various object detection algorithms can be utilized, including neural network algorithms, such as Faster R-CNN or YOLO, and non-neural network algorithms, such as SIFT.

Figure 7A:
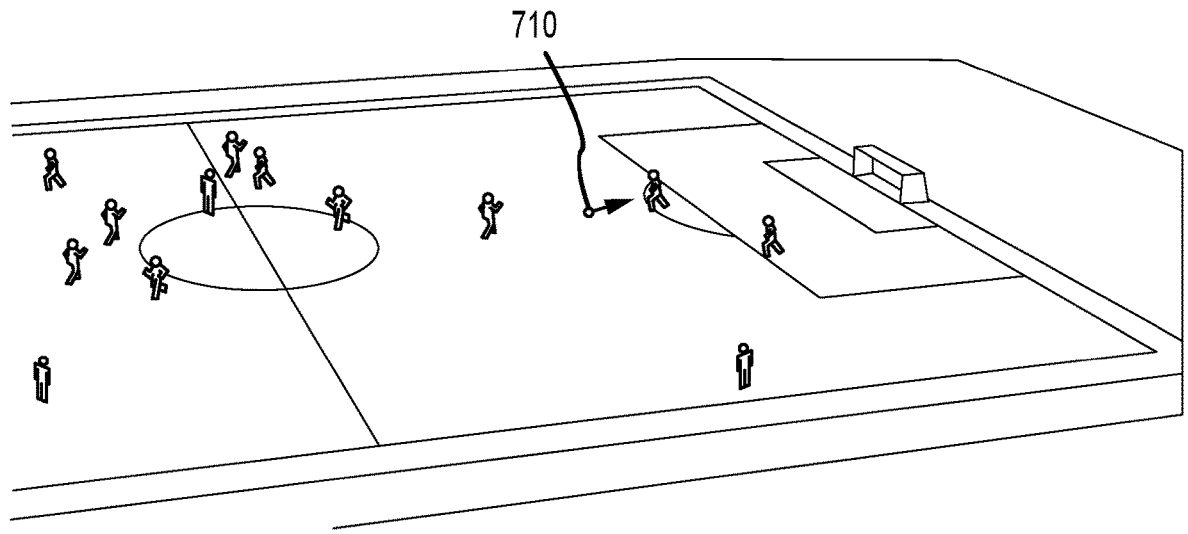
FIGS. 7A and 7B show two video frames from a video stream of a sporting event, and illustrate how movements of the ball in play at the sporting event can be used to align the two video streams.
Figure 7B:
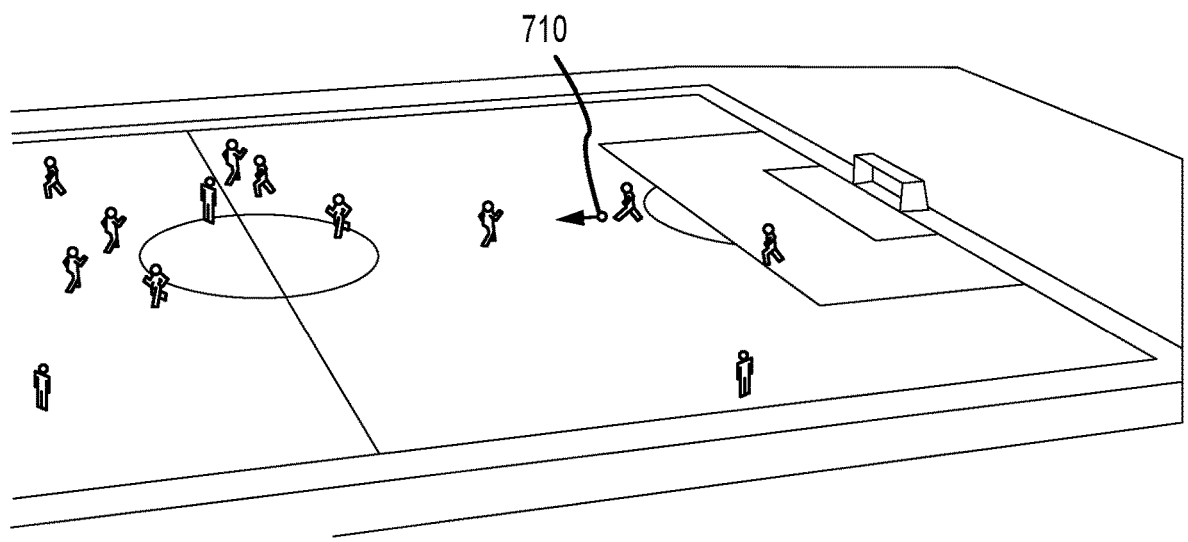

In step 106, comparing the depictions of the movements of the ball in the first video stream with the depictions of the movements of the ball in the second video stream could, for example, comprise comparing changes in the movement of the ball, as depicted in the first video stream, with changes in the movement of the ball, as depicted in the second video stream. The movement of the ball can change abruptly, from frame-to-frame, within a video stream, as may be seen from FIGS. 7A and 7B, which show two video frames from a video stream of a sporting event. As is apparent, the sporting event is a soccer game. In FIG. 7A, the soccer ball is moving towards a player; the player then kicks the ball, which results in the ball abruptly moving in the opposite direction, as shown in FIG. 7B. Such abrupt changes in movement assist in time-alignment because they are associated with a very narrow time window and tend to be visually distinctive.

In addition, or instead, comparing the depictions of the movements of the ball in the first video stream with the depictions of the movements of the ball in the second video stream could, for example, comprise comparing the horizontal or vertical movement of the ball in the first video stream with the corresponding movement of the ball in the second video stream. In this context, horizontal movement of the ball in the video stream means movement in the left-right direction within the frames of the video stream, whereas vertical movement means movement in the up-down direction within the frames of the video stream.

Where the cameras producing the first and second video streams have been calibrated (so that their extrinsic and intrinsic parameters are known), it is possible to determine how different the viewpoints for the two video streams are. (As noted above, a wide range of approaches for camera calibration is available, including those disclosed in commonly assigned U.S. Pat. No. 10,600,210 B1.) Where the viewpoints are relatively similar, suitable performance may be obtained simply by comparing 2D horizontal movements in the first video stream (i.e., movements of the ball in the left-right direction within the frames of the first video stream) with 2D horizontal movements in the second video stream (i.e., movements of the ball in the left-right direction within the frames of the second video stream).

A more general approach, which does not require the video streams to have similar viewpoints, is to convert the movements of the ball, as depicted in the second video stream, into 3D movements, and to then determine the component of such 3D movements in the horizontal (or vertical) direction of the first video stream. In this way, a like-for-like comparison of the movements can be carried out. Converting the 2D movements depicted in a video stream into 3D movements can be achieved in various ways. In one example, the 3D movements can be determined by triangulation of the ball using the second video stream in combination with a third video stream, which is time-aligned with the second video stream (i.e. the time offset between the second and third video streams is known). Additionally, to assist in performing triangulation, the cameras producing the second and third video streams may be calibrated (so that their extrinsic and intrinsic parameters are known).

Figure 8A:
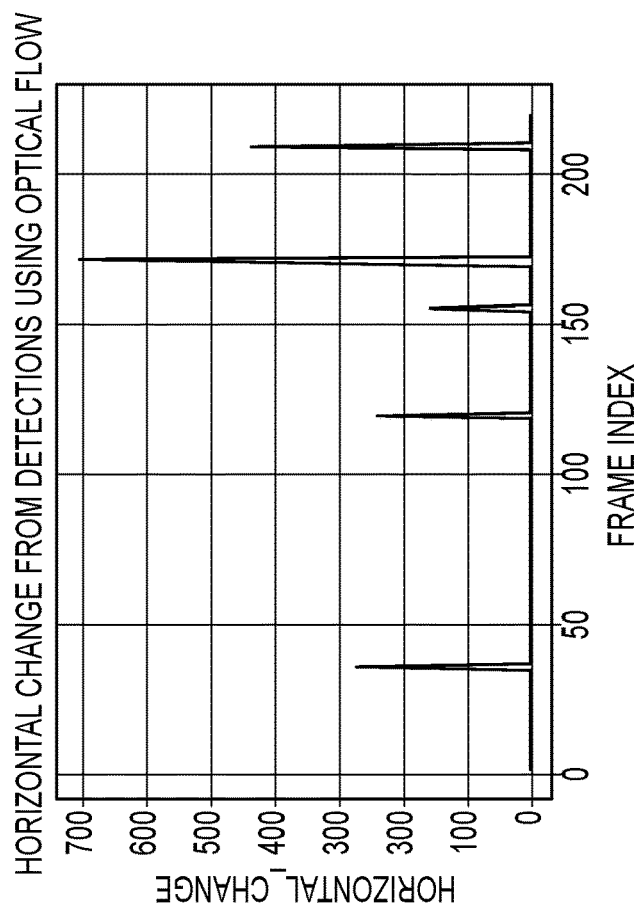
FIGS. 8A and 8B are graphs of the change in horizontal position of the ball, as determined using, respectively, the video stream whose frames are shown in FIGS. 3A and 3B, and a three-dimensional position of the ball, as derived from one or more other video streams of the sporting event.
Figure 8B:
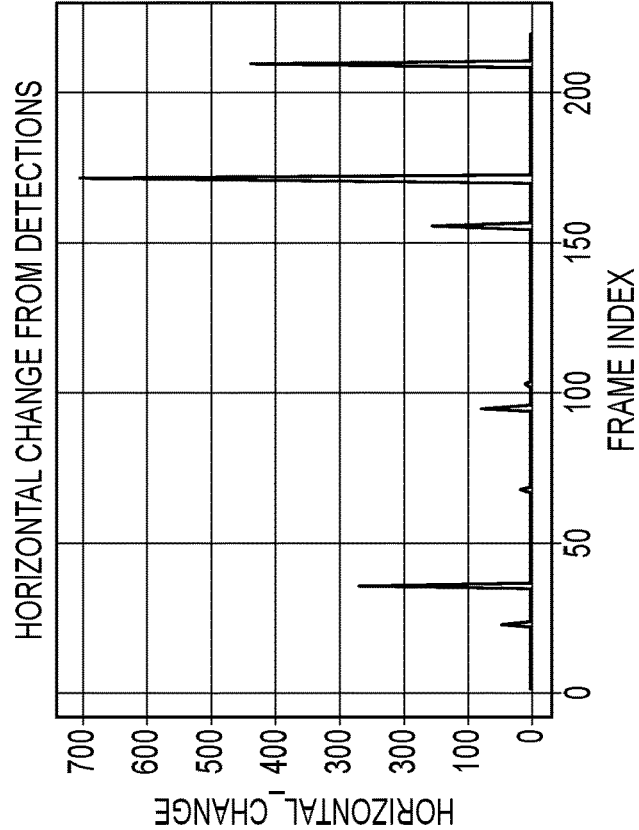

FIGS. 8A and 8B illustrate an example where such an approach has been applied to the video stream whose frames are shown in FIGS. 7A and 7B. FIG. 8A shows the changes in horizontal movement, from one frame to the next, for the video stream whose frames are shown in FIGS. 7A and 7B. As described above, 2D movements in a second video stream are converted into 3D movements, using triangulation with a third, synchronized video stream. The component of such 3D movements in the horizontal direction of the first video stream (illustrated in FIGS. 7A and 7B) is then determined. The frame-to-frame changes in the thus-determined components of the 3D movements are shown in FIG. 8B. As can be seen, both FIGS. 8A and 8B show peaks with very short duration. The two time series can be compared, for example using a cross-correlation function, in order to find a likely time offset between the two series.

Note that while the above approach converts the 2D movements in the second video stream into 3D movements, the 2D movements in the first video stream could be converted into 3D movements instead. Indeed, the designation of a given one of two video streams as "first" or "second" is essentially arbitrary, given that the method 100 of FIG. 1 treats the first and second video streams symmetrically.

Also note that, while horizontal and vertical movements are described above, this is merely for the sake of simplicity and 2D movements in other directions could also be compared in step 106.

Alignment Using Head Positions

A further example of a kind of visually distinctive activity that is suitable for aligning video streams is changes in the positions of the heads of participants in a sporting event (e.g. changes in the positions of the heads of the players and/or referees of the sporting event). The participants' heads can be characterized as being: visible from multiple positions and orientations at the sporting event; and changing in appearance regularly over the course of the sporting event. For these reasons (and/or other reasons), using changes in the positions of the participants' heads as the first kind of visually distinctive activity in the method 100 of FIG. 1 may provide robust and/or accurate alignment of video streams.

In steps 101 and 102 of method 100, depictions of participants' heads within a video stream may be identified using various approaches. For instance, various computer vision algorithms can be utilized, for example utilizing neural networks, such as Faster R-CNN, YOLO, or OpenPose, or utilizing feature detection algorithms such as SIFT or SURF.

In step 106 of method 100, comparing the changes in the depictions of the positions of the heads of participants in the first video stream with the depictions of changes in the positions of the heads of participants second video stream could, for example, comprise converting the (2D) head positions, as depicted in several of the frames of the second video stream, into 3D head positions, then reprojecting these 3D positions into one of the frames of the first video stream. Converting 2D head positions into 3D head positions can be carried out in a similar manner to the approach described above for converting 2D ball movements to 3D ball movements in the "Alignment Using Ball Movements" section.

Figure 9A:
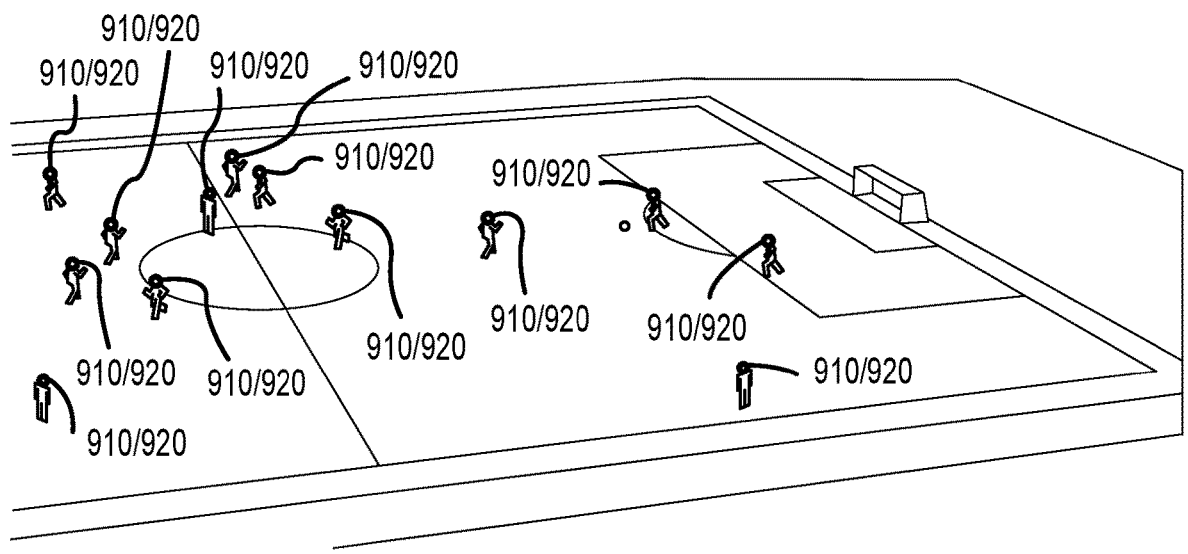
FIGS. 9A and 9B show the same frame from a video stream of a sporting event, where a head position for each player is projected based on a head position determined using respective frames from a second video stream of the sporting event.
Figure 9B:
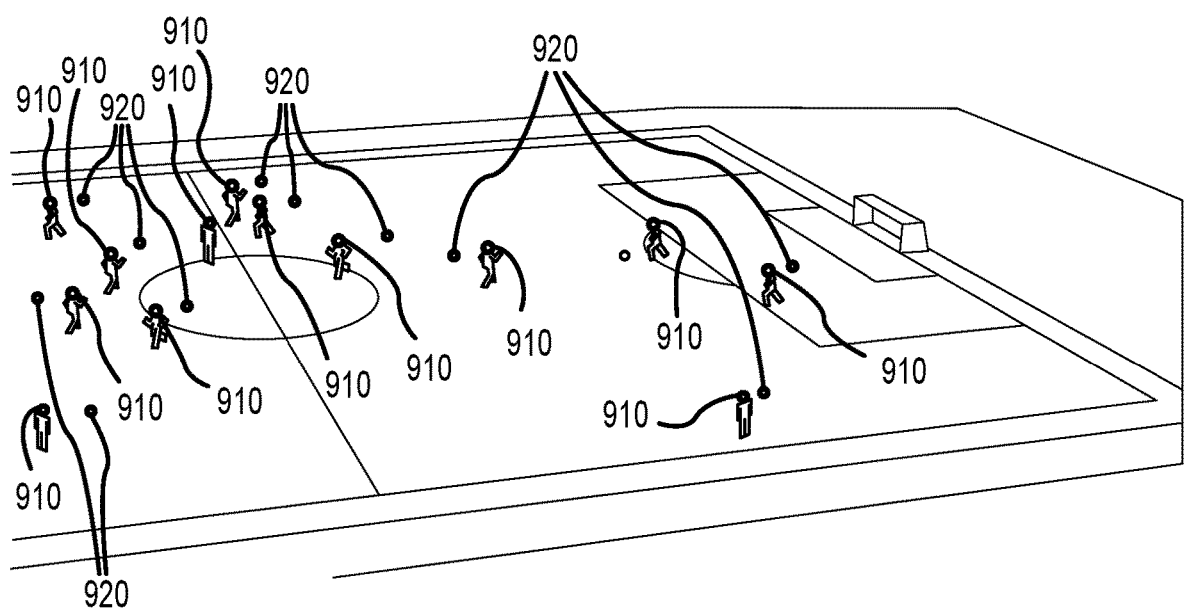

Reprojecting the head positions from the second video stream allows for a like-for-like comparison of the head positions. The frame with the closest match between identified head positions 910 and reprojected head positions 920 indicates a possible time offset between the two video streams. This is illustrated in FIGS. 9A and 9B, which show the same frame from a first video stream of a soccer game, and thus the same identified head positions 910. However, each of FIGS. 9A and 9B shows reprojected head positions 920 that correspond to a different frame from the second video stream. As is apparent, the reprojected head positions 920 shown in FIG. 9A are a much better match than the reprojected head positions 920 shown in FIG. 9B.

This process of converting the head positions to 3D and reprojecting to find a closet matching frame from the first video stream can be repeated for additional frames from the first video stream, so as to provide further estimates of the time offset, and thus a more accurate final determination of the time offset between the video streams.

Alignment Using Body Poses

A still further example of a kind of visually distinctive activity that is suitable for aligning video streams is changes in the body poses of participants in a sporting event (e.g. changes in the positions and orientations of the heads, limbs and torsos of the players and/or referees of the sporting event). The participants' body poses can be characterized as being: visible from multiple positions and orientations at the sporting event; and changing in appearance regularly over the course of the sporting event. For these reasons (and/or other reasons), using changes in the body poses of participants as the first kind of visually distinctive activity in the method 100 of FIG. 1 may provide robust and/or accurate alignment of video streams.

Figure 10A:
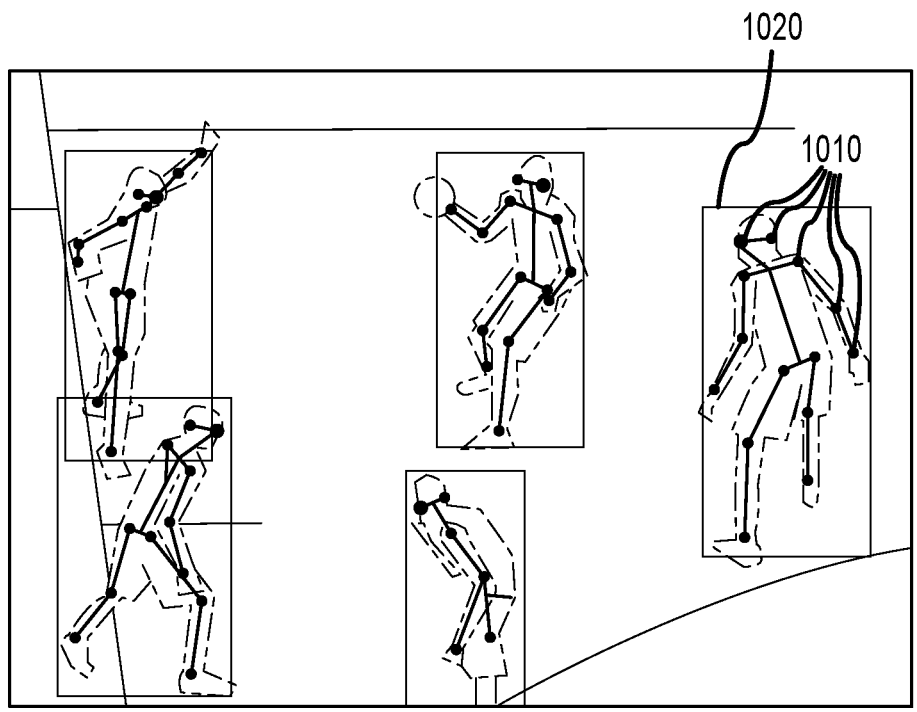
FIGS. 10A and 10B show the body poses of a number of participants in a sporting event as determined from a first and second frame respectively of a video stream of a sporting event.
Figure 10B:
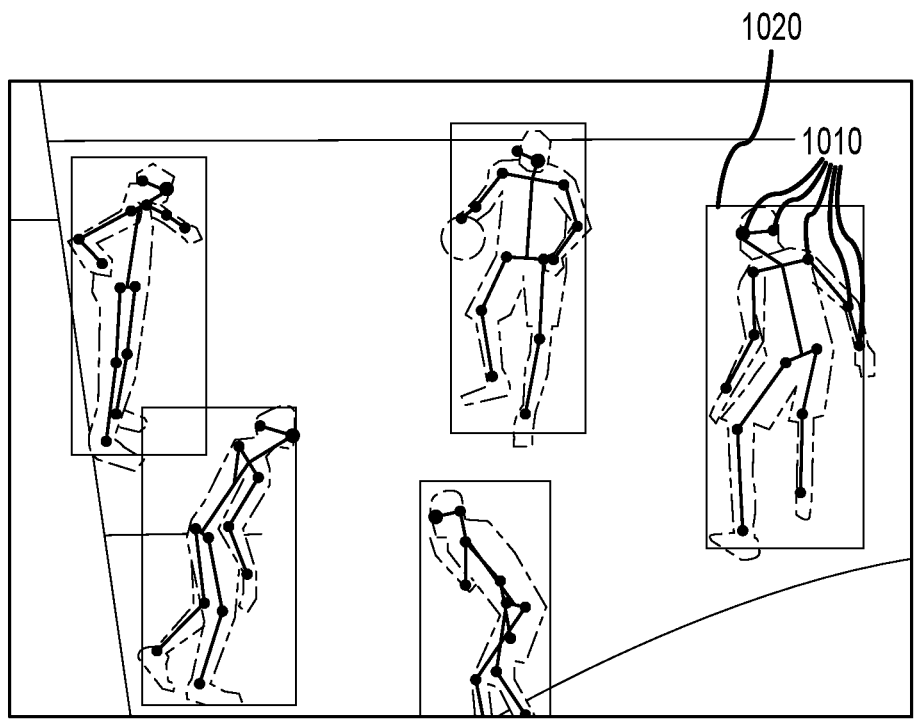

In steps 101 and 102 of method 100, depictions of participants' body poses may be identified within a video stream using various approaches. For instance, various computer vision algorithms can be utilized, for example utilizing neural networks, such as Mask R-CNN, OpenPose, Alpha-Pose. Computer vision algorithms can, for example, be used to identify keypoints 1010 on the body of each participant, such as the head, shoulders, elbows, wrists, hips, knees and ankles of the participant in question 1020, as illustrated in FIGS. 10A and 10B. The set of locations for these keypoints characterizes the body pose of the participant.

Step 106 of method 100 may, for example, comprise similar substeps to those described above in the "Alignment Using Head Positions" section. Specifically, 2D positions of body keypoints in several frames of the second video stream can be converted into 3D positions and then reprojected onto a frame from the first video stream to find a closest matching frame.

As compared with the head positions of participants, the positions of body poses will tend to vary more rapidly, as is apparent from comparing FIGS. 10B and 10A: while the head positions move only a small amount between the two frames shown in FIGS. 10A and 10B respectively, the positions of other keypoints, such as elbows and wrists, move substantially. Consequently, using body poses to align video streams may provide a relatively accurate result. Moreover, a relatively accurate result can be achieved even when only one participant is visible in a video frame, as this still provides multiple keypoints that can be used for comparison.

Combinations

It is envisaged that, to provide still more robust time alignment of video streams, two or more of the above approaches may optionally be combined. In this regard, reference is directed once more to FIG. 1. As shown, method 100 includes an optional step 103 of identifying one or more depictions of a second, different kind of visually distinctive activity in the first video stream, and an optional step 104 of identifying one or more depictions of the second kind of visually distinctive activity in the second video stream. Correspondingly, and as shown in FIG. 1, the determining 106 of the time offset between the first video stream and the second video stream optionally comprises comparing 109 the depictions of the second kind of visually distinctive activity in the first video stream with the depictions of the second kind of visually distinctive activity in the second video stream. The second kind of visually distinctive activity may, for instance, be any one of the examples illustrated above with reference to FIGS. 2A-10B.

In examples, step 109 of comparing the depictions of the second kind of visually distinctive activity in the first video stream with the depictions of the second kind of visually distinctive activity in the second video stream may yield one estimate for the time offset, and step 108 of comparing the depictions of the first kind of visually distinctive activity in the first video stream with the one or more depictions of the first kind of visually distinctive activity in the second video stream may yield another estimate for the time offset. In such examples, in step 106 the time offset can be determined based on both of these estimates.

It should be noted that, although FIG. 1 shows steps 101 and 102 as occurring prior to optional steps 103 and 104, in other embodiments steps 101 and 102 could occur after optional steps 103 and 104, or could occur simultaneously with steps 103 and 104. Indeed, steps 101-104 may be carried out in any suitable order.

Figure 11:
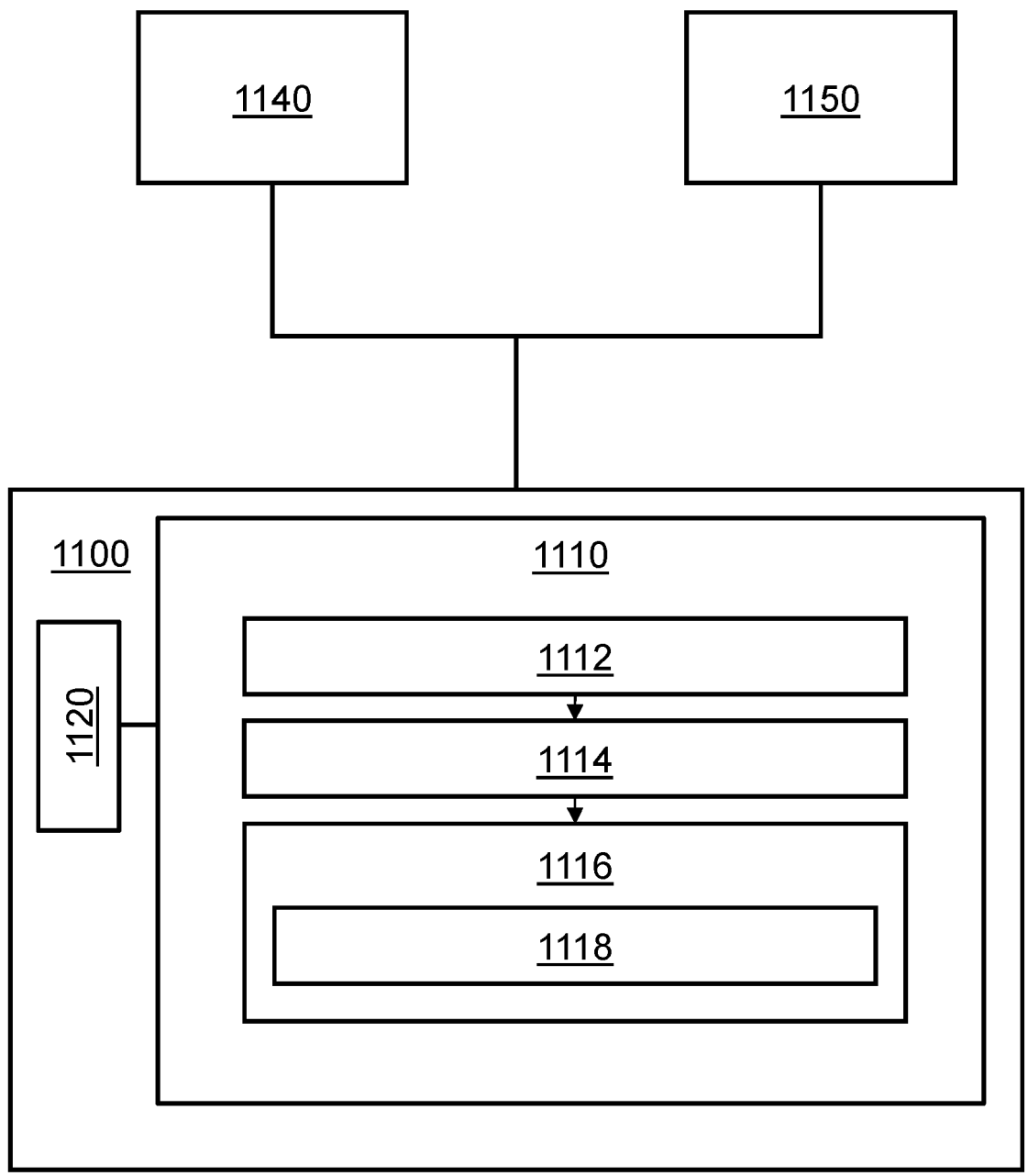
FIG. 11 is a schematic diagram of a video processing system according to a further illustrative embodiment.

Reference is now directed to FIG. 11, which is a schematic diagram of a video processing system according to a further illustrative embodiment. As shown, the video processing system 1100 comprises a memory 1110 and a processor 1120. The memory 1110 stores a plurality of computer-executable instructions 1112-1118 that, when executed by the processor 1120 cause the processor to:

identify 1112 one or more depictions of a first kind of visually distinctive activity in a first video stream depicting a sporting event;

identify 1114 one or more depictions of the first kind of visually distinctive activity in a second video stream depicting the sporting event; and determine 1116 a time offset between the first video stream and the second video stream.

The determining of the time offset comprises comparing 1118 the one or more depictions of the first kind of visually distinctive activity in the first video stream with the one or more depictions of the first kind of visually distinctive activity in the second video stream.

Any of the kinds of visually distinctive activities described above with reference to FIGS. 2A-10B can be utilized in the video processing system 1100. Moreover, the approaches for identifying and comparing depictions of visually distinctive activity described above with reference to FIGS. 2A-10B can be implemented in video processing system 1100.

The memory 1110 may of any suitable type, such as comprising one or more of: Random Access Memory (RAM), Read Only Memory (ROM), Electrically Erasable Programmable Read Only Memory (EEPROM), and flash memory.

Although only one processor 1120 is shown in FIG. 11, it will be appreciated that the system 1100 could comprise multiple processors. Particularly (but not exclusively) where the system 1100 comprises multiple processors, the system 1100 may comprise a GPU and/or a neural network accelerator.

The video streams of the sporting event can be received from various sources. In particular, it is envisaged that the system 1100 of FIG. 11 could be employed where the first and/or the second video streams are generated by portable devices 1140, 1150 that comprise cameras, such as smartphones or tablet devices. The inventors consider that solutions are lacking for alignment of video streams generated by such devices, as compared with video streams generated by conventional, broadcast cameras. Nevertheless, the method 100 of FIG. 1 can equally be employed where the first and/or the second video streams are generated by conventional, broadcast cameras.

The video streams can be received via any suitable communication system. For example, the video streams might be transmitted over the internet, over an intranet (e.g., which includes the video processing system 1100), via a cellular network (particularly, but not exclusively, where the video streams are generated by portable devices 1140, 1150), or via a bus of video processing system 1100.

It should be noted that, although the video streams in the embodiments described above with reference to FIGS. 1-11 depict a sporting event, it is envisaged that many embodiments, and particularly the method 100 described above with reference to FIG. 1 and the system 1100 described above with reference to FIG. 11, may be adapted to process video streams depicting other kinds of live events, such as, for example, concerts, comedy shows or plays.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A video processing method implemented by one or more processors that execute computer readable instructions stored on memory, the method comprising:
    processing a first video stream depicting a sporting event to determine a total or mean pixel intensity for a plurality of frames in the first video stream;
    processing a second video stream depicting the sporting event to determine a total or mean pixel intensity for a plurality of frames in the second video stream;
    identifying one or more depictions of at least one camera flash occurring during the sporting event in the first video stream depicting the sporting event, by analysing the determined total or mean pixel intensity for the plurality of frames in the first video stream;
    identifying one or more depictions of the at least one camera flash in the second video stream depicting the sporting event, by analysing the total or mean pixel intensity for the plurality of frames in the second video stream;
    determining a time offset between the first video stream and the second video stream, and
    processing at least one of the first video stream and the second video stream based on the determined time offset,
    wherein said determining of the time offset comprises comparing the one or more depictions of the at least one camera flash in the first video stream with the one or more depictions of the at least one camera flash in the second video stream.

2. The method of claim 1, comprising receiving the first video stream from a first portable device comprising a camera.

3. The method of claim 2, wherein the first portable device is a smartphone.

4. The method of claim 1, comprising:
    identifying one or more depictions of a second kind of visually distinctive activity in the first video stream; and
    identifying one or more depictions of the second kind of visually distinctive activity in the second video stream,
    wherein said determining of the time offset comprises comparing the one or more depictions of the second kind of visually distinctive activity in the first video stream with the one or more depictions of the second kind of visually distinctive activity in the second video stream.

5. A video processing system comprising:
    memory storing a plurality of computer-executable instructions;
    one or more processors that execute the computer-executable instructions, the computer-executable instructions causing the one or more processors to:
    process a first video stream depicting a sporting event to determine a total or mean pixel intensity for a plurality of frames in the first video stream;
    process a second video stream depicting the sporting event to determine a total or mean pixel intensity for a plurality of frames in the second video stream;
    identify one or more depictions of at least one camera flash occurring during the sporting event in the first video stream depicting the sporting event, by analysing the determined total or mean pixel intensity for the plurality of frames in the first video stream;
    identify one or more depictions of the at least one camera flash in the second video stream depicting the sporting event, by analysing the determined total or mean pixel intensity for the plurality of frames in the second video stream;
    determine a time offset between the first video stream and the second video stream; and
    process at least one of the first video stream and the second video stream based on the determined time offset,
    wherein the system determines the time offset at least by comparing the one or more depictions of the at least one camera flash in the first video stream with the one or more depictions of the at least one camera flash in the second video stream.

6. A non-transitory, computer-readable storage medium comprising a set of computer-readable instructions which, when executed by one or more processors, cause the one or more processors to:
    process a first video stream depicting a sporting event to determine a total or mean pixel intensity for a plurality of frames in the first video stream;
    process a second video stream depicting the sporting event to determine a total or mean pixel intensity for a plurality of frames in the second video stream;
    identify one or more depictions of at least one camera flash occurring during the sporting event in the first video stream depicting a sporting event, by analysing the determined total or mean pixel intensity for the plurality of frames in the first video stream;
    identify one or more depictions of the at least one camera flash occurring during the sporting event in the second video stream depicting the sporting event, by analysing the determined total or mean pixel intensity for the plurality of frames in the second video stream;
    determine a time offset between the first video stream and the second video stream; and
    process at least one of the first video stream and the second video stream based on the determined time offset,
    wherein the system determines the time offset at least by comparing the one or more depictions of the at least one camera flash in the first video stream with the one or more depictions of the at least one camera flash in the second video stream.

7. The method of claim 1, wherein:

analysing the total or mean pixel intensity for the plurality of frames in the first video stream comprises identifying a peak in the total or mean pixel intensity in the plurality of frames in the first video stream; and analysing the total or mean pixel intensity for the plurality of frames in the second video stream comprises identifying a peak in the total or mean pixel intensity in the plurality of frames in the second video stream.

8. The video processing system of claim 5, the computer-executable instructions causing the one or more processors to:

analyse the total or mean pixel intensity for the plurality of frames in the first video stream by identifying a peak in the total or mean pixel intensity in the plurality of frames in the first video stream; and analyse the total or mean pixel intensity for the plurality of frames in the second video stream by identifying a peak in the total or mean pixel intensity in the plurality of frames in the second video stream.

9. The non-transitory, computer-readable storage medium of claim 6, wherein the set of computer-readable instructions which, when executed by the one or more processors, cause the one or more processors to:

analyse the total or mean pixel intensity for the plurality of frames in the first video stream by identifying a peak in the total or mean pixel intensity in the plurality of frames in the first video stream; and analyse the total or mean pixel intensity for the plurality of frames in the second video stream by identifying a peak in the total or mean pixel intensity in the plurality of frames in the second video stream.

\* \* \* \* \*